(12) United States Patent
Kalland et al.

(10) Patent No.: US 7,649,840 B2
(45) Date of Patent: Jan. 19, 2010

(54) METHOD, MEANS AND COMPUTER PROGRAM PRODUCT FOR CONTROLLING AND/OR RESTRICTING USE OF TELECOMMUNICATIONS CONNECTION

(75) Inventors: Rolf Kalland, Helsinki (FI); Massimo Nardone, Helsinki (FI)

(73) Assignee: Comptel Oyj, Helsinki (FI)

( * ) Notice: Subject to any disclaimer, the term of this patent is extended or adjusted under 35 U.S.C. 154(b) by 676 days.

(21) Appl. No.: 10/516,740

(22) PCT Filed: Jul. 4, 2003

(86) PCT No.: PCT/FI03/00546

§ 371 (c)(1), (2), (4) Date: Oct. 12, 2005

(87) PCT Pub. No.: WO2004/008687

PCT Pub. Date: Jan. 22, 2004

(65) Prior Publication Data

US 2006/0153160 A1    Jul. 13, 2006

(30) Foreign Application Priority Data

Jul. 12, 2002   (FI) .................................. 20021378

(51) Int. Cl.
*H04J 3/14* (2006.01)

(52) U.S. Cl. ............... 370/230.1; 370/389; 379/114.01; 379/207.02; 709/224

(58) Field of Classification Search .............. 370/351, 370/352, 389, 395.53, 468, 237, 230, 230.1; 709/206, 224, 227, 249; 379/207.02, 114.01, 379/127.01, 112.01; 455/67.11, 426.1; 705/40
See application file for complete search history.

(56) References Cited

U.S. PATENT DOCUMENTS

| | | | | |
|---|---|---|---|---|
| 5,901,207 A | * | 5/1999 | Pickeral | 379/127.01 |
| 6,101,250 A | * | 8/2000 | Tiainen | 379/207.02 |
| 6,122,255 A | * | 9/2000 | Bartholomew et al. | 370/237 |

(Continued)

FOREIGN PATENT DOCUMENTS

| | | |
|---|---|---|
| EP | 1 189 404 A1 | 3/2002 |
| WO | WO-00/24161 A1 | 4/2000 |
| WO | WO-02/37759 A1 | 5/2002 |

OTHER PUBLICATIONS

Srisuresh, et al., "Middlebos Communication Architecture and framework", Jul. 2001, Network Working Group, all pages.*
Rosenberg, J., et al.,: Sipping WG. Jun. 24, 2002.

*Primary Examiner*—Kwang B Yao
*Assistant Examiner*—Jeffrey M Rutkowski
(74) *Attorney, Agent, or Firm*—Birch, Stewart, Kolasch & Birch, LLP

(57) ABSTRACT

The invention includes method for monitoring and/or limiting the use of a data communications connection subject to payment between IP clients in a packet-switched connection network, in which method the operator terminal, such as a SIP system, of the signalling channel of the connection station of the client is set to control a traffic limiter, such as a firewall in the operator's traffic-relaying system between the source terminal and the destination terminal. The invention also includes a system for limiting the use of a data communications connection subject to payment, between IP clients, in a packet-switched connection network and a computer software product for limiting the use of a data communications connection subject to payment, between IP clients, in a packet-switched connection network.

27 Claims, 4 Drawing Sheets

U.S. PATENT DOCUMENTS

| | | | |
|---|---|---|---|
| 6,252,952 B1 * | 6/2001 | Kung et al. | 379/114.1 |
| 6,285,748 B1 * | 9/2001 | Lewis | 379/112.01 |
| 6,587,433 B1 * | 7/2003 | Borella et al. | 370/230 |
| 7,126,941 B1 * | 10/2006 | Clemm et al. | 370/352 |
| 2002/0026515 A1 * | 2/2002 | Michielsens et al. | 709/227 |
| 2002/0036983 A1 * | 3/2002 | Widegren et al. | 370/230.1 |
| 2002/0146005 A1 * | 10/2002 | Gallant et al. | 370/389 |
| 2003/0040280 A1 * | 2/2003 | Koskelainen | 455/67.1 |
| 2003/0083988 A1 * | 5/2003 | Reith | 705/40 |
| 2003/0093481 A1 * | 5/2003 | Mitchell et al. | 709/206 |
| 2006/0104203 A1 * | 5/2006 | Krantz et al. | 370/230 |
| 2008/0049615 A1 * | 2/2008 | Bugenhagen | 370/230.1 |

* cited by examiner

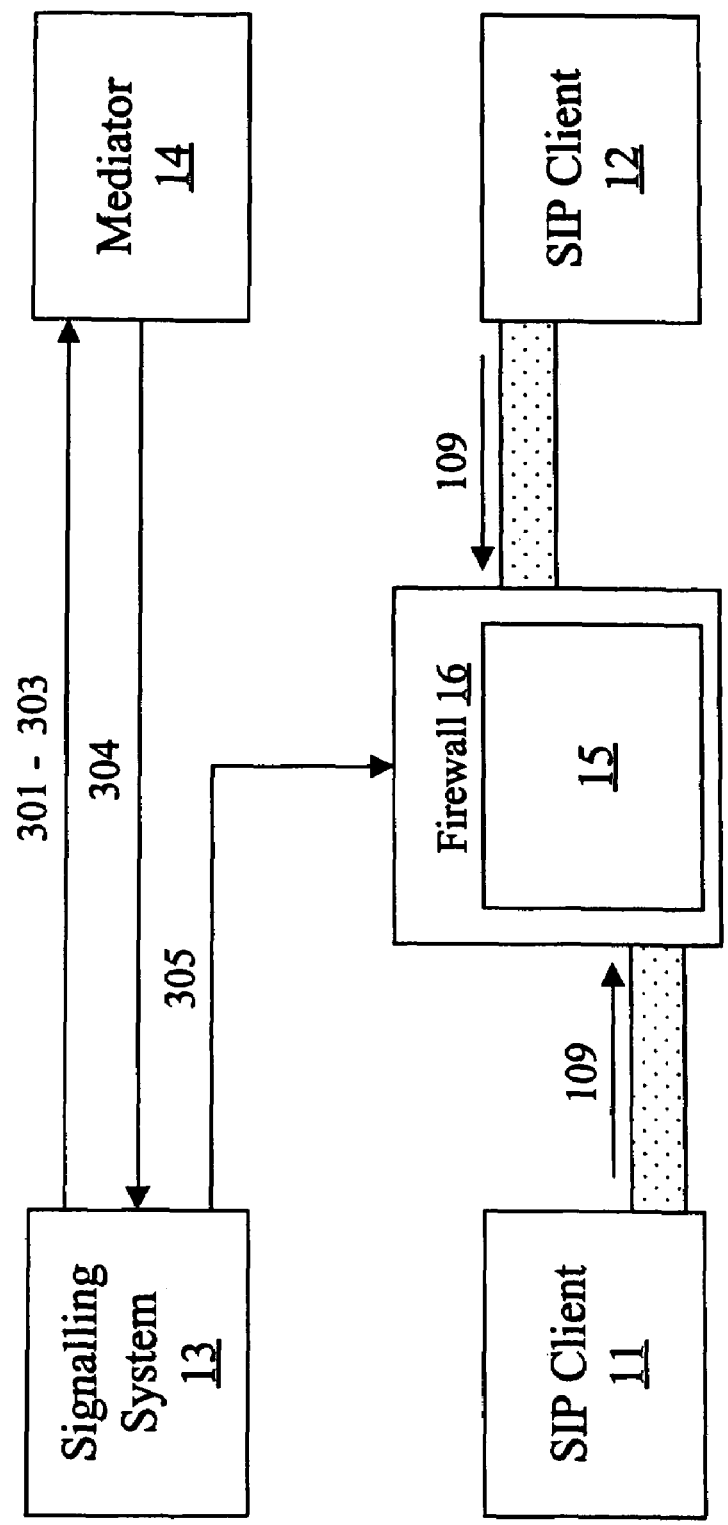

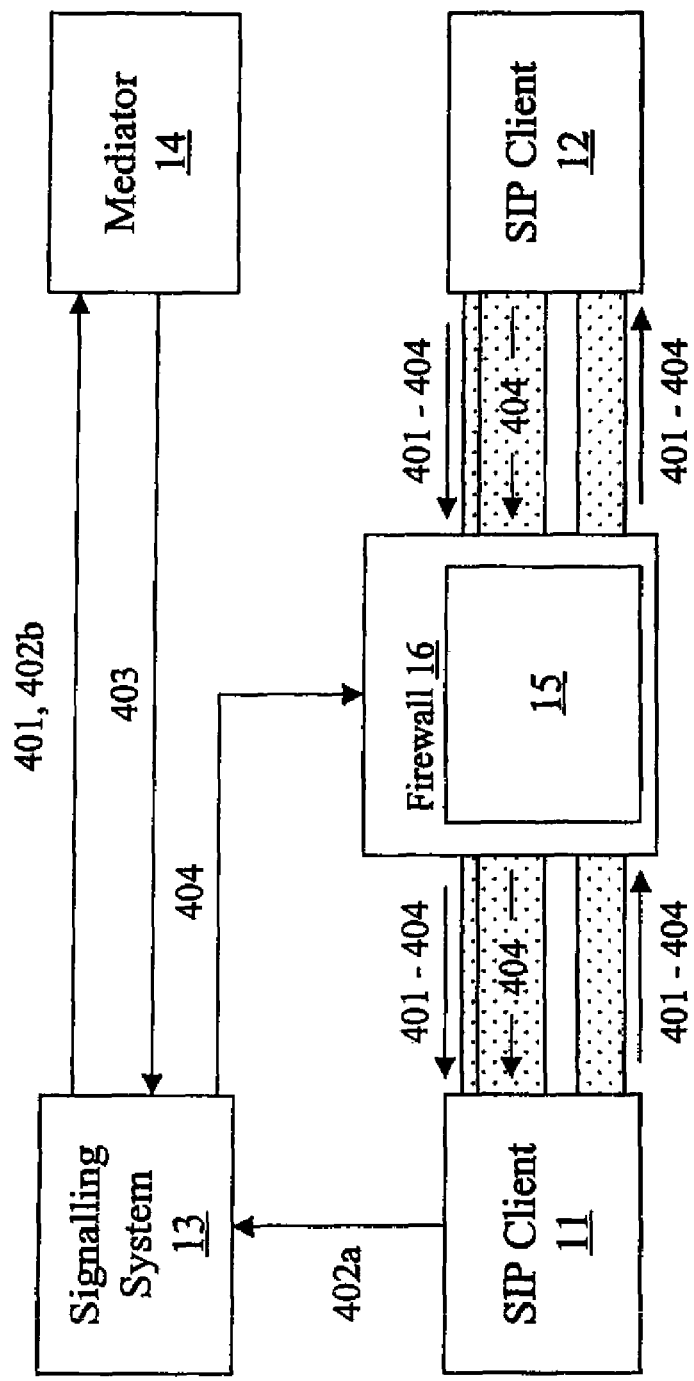

METHOD, MEANS AND COMPUTER PROGRAM PRODUCT FOR CONTROLLING AND/OR RESTRICTING USE OF TELECOMMUNICATIONS CONNECTION

BACKGROUND OF THE INVENTION

1. Field of the Invention

The present invention relates to a method for monitoring and/or limiting the use of a connection, subject to payment, between IP clients in a packet-switched connection network.

The present invention also relates to a system for monitoring and/or limiting the use of a connection, subject to payment, between IP clients in a packet-switched connection network.

The present invention also relates to a computer software product for monitoring and/or limiting the use of a connection, subject to payment, between IP clients in a packet-switched network.

2. Description of Related Art

According to the state of the art, in operators' connection networks between IP clients, which have genuinely packet-switched connections, data communications connections can be provided customer specifically. It is possible to require that the customer's identifier and identifier verification data must be received before a customer can be provided with an individuated network connection. The quality parameters can be defined customer specifically. These quality parameters can, for example, define the characteristics of the data communications connections relayed over the individuated network connection. Such characteristics are, for example, the capacity of the data communications connection to be relayed, its delay, delay variation, and the loss and error ratio in the transmission of the data packets. Data communications connections ensuring the quality parameters are charged for on the basis of availability, the quantity of data transmitted, capacity, and/or the duration of the connection.

A drawback of the state of the art is the limited reliability of billing for Next Generation Networks, when the duration of the connection is used to charge for a data communications connection that ensures the quality parameters. The data communications connection between the clients and the signalling link set to monitor the use of the data communications connection are typically separate. In IP networks, data communications connections, such as IP voice connections, are set on the basis of data received over a signalling link, from the direction of the customer. Connection-duration-based billing uses data received from the customer's terminal over a signalling link. Information differing from reality, concerning the use of the data communications connection, can be received from the direction of the customer's terminal, for example, indicating that use of a set IP session has been terminated, even though in reality use of the relevant IP session has not been terminated. When using, for example, the known method disclosed in the network publication "Nat and Firewall Scenarios and Solutions for SIP" by J. Rosenberg et al., SIPPING WG, Jun. 24, 2002, the connection cannot be broken completely, only the granting of quality guarantees can be terminated.

A further drawback of the state of the art in terms of billing is the fact that, in a packet-switched IP network, anyone can form a connection with anyone else, without paying anything for this connection. This requires that the parties know each other's IP addresses. Solutions also exist, in which the operator has defined for or given the clients (unreliable clients) specific IP addresses. In this case, the clients are always treated as unreliable clients. In such solutions, fraud is easy, because after the closing request (BYE) given over the signalling channel, it is entirely possible to continue the connection, without paying the operator anything for this connection time or event. A customer generally uses data communications services in order to gain some benefit, which is not directly proportional to the quality of the available connection and/or to the amount of data transmitted over the connection. At present, billing for a network connection or data communications connection cannot be controlled in such a way as to be in proportion to the customer benefit. Thus, data communications resources cannot be allocated to provide the greatest customer benefit to their clientele, instead the use of data communications resources must be restricted using parameters that are of secondary importance to the customer.

The invention is intended to eliminate the defects of the state of the art disclosed above and for this purpose create an entirely new type of method for monitoring and/or limiting the use of a data communications connection.

SUMMARY OF THE INVENTION

The invention is based on setting an operator terminal, such an a SIP system, of the signalling channel of the connection state of the client, which is set to control a traffic limiter, such as a firewall, in the traffic relay system over the data communications connection between the source client and the destination client. In addition, the operator terminal of the signalling channel can be set to monitor the traffic limiter.

More specifically, the method according to the invention, for limiting the use of a data communications connection, is characterized by a message being received from the signalling connection concerning the interruption or termination of the session transmitted over the mutual data communications connection, and/or state data being received from the billing system, over the message connection, concerning an absence in the billing system or a deficiency in the billing system of the payment required for providing the session being transmitted over the mutual data communications connection, in response to the message concerning the interruption or termination (107) of the session, and/or to the state data (304) received from the billing system, at least one traffic limiter is instructed (212, 305) to break, interrupt, or close the session over the mutual data communications connection, and a two-way signalling link is set (302) between the connection-formation system (13) and the billing system, through the mediator (14).

Other aspects of the present invention are directed to a system and a computer program through which the aforementioned method may be performed.

The following advantages are gained with the aid of the invention. Billing for an IP connection guaranteeing quality parameters is made more reliable. Such an IP connection can be, for instance, an IP call guaranteeing the quality parameters. The invention makes it possible to substantially restrict a customer from benefiting from potentially fraudulent actions. The invention makes it substantially more difficult to form, through a connection network, a fraudulent non-paying connection in a packet-switched IP network. Possible fraud can be made more difficult by closing the session or connection between the terminals after a connection-closing (BYE) request made over the signalling channel. With the aid of the invention, the use of data communications connection in an IP network can be billed for on the basis of customer benefit, and thus greater customer benefit can be produced with limited data communications resources.

In addition, with the aid of the invention various additional services subject to payment can be provided with greater flexibility. Such services can be, for example, multimedia services tailored to meet momentary or long-term needs.

BRIEF DESCRIPTION OF THE DRAWINGS

In the following, the invention is examined with the aid of examples and with reference to the accompanying drawings.

FIG. 3 shows one method according to the invention for limiting the use of a data communications connection, using as the initiator the payment set for the use of the data communications connection.

FIG. 4 shows one method according to the invention, for increasing customer benefit.

DETAILED DESCRIPTION OF THE INVENTION

Figure 1:
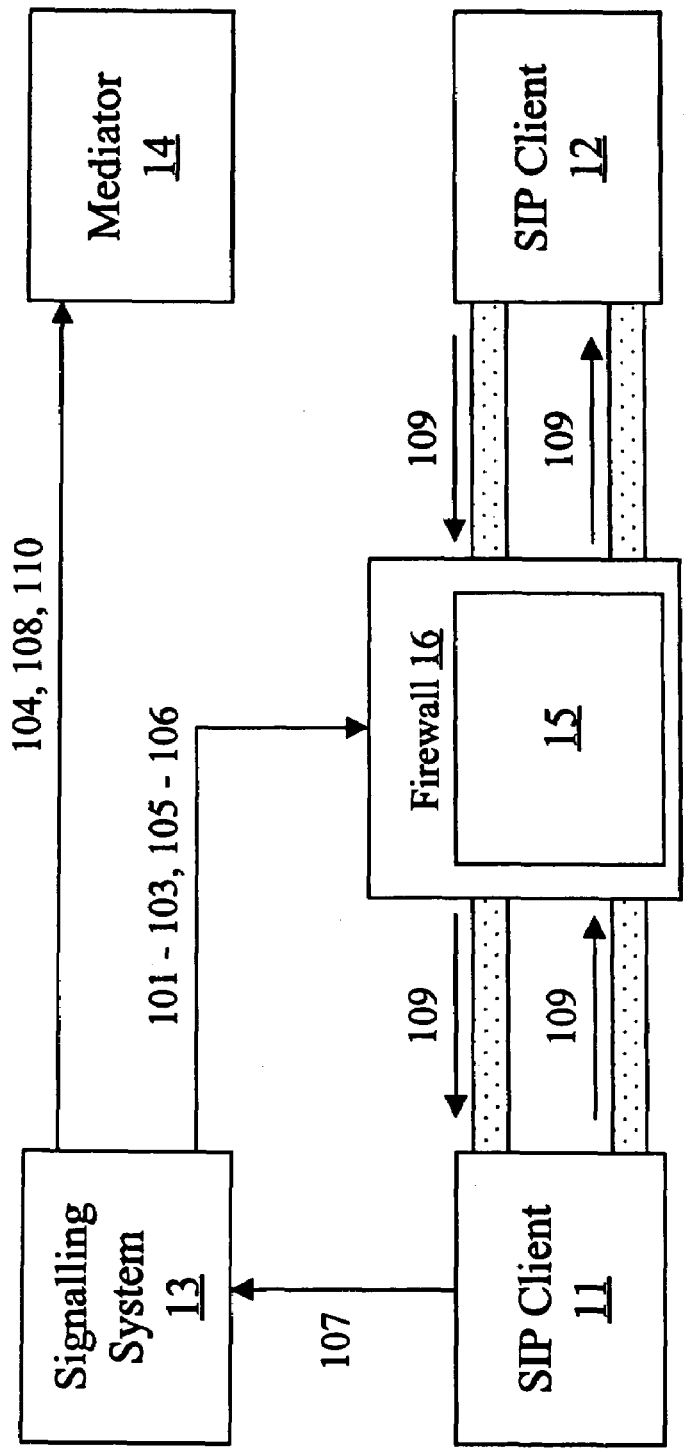
FIG. 1 shows a known method for limiting the use of a data communications connection.

In the method of FIG. 1, the following numbered elements are used. The first SIP client 11 and the second SIP client 12 are customer IP clients of an SIP system. The SIP system 13 is an address search and connection-formation system, which is used when forming IP connections between SIP customers in the operator's traffic relaying system 15. Thanks to the SIP system 13, SIP clients need not know the IP addresses of other SIP clients to be able to contact them over a data communications connection. At least one SIP client 12 is addressed in the address-search system in such a way that the address-search system is given the IP address of the SIP client 12 in response to a desired initiator. SIP customers can be guaranteed a quality of data communications connections relayed over the operator's traffic relaying system 15 that need not necessarily be guaranteed for data communications relayed over the public Internet. The mediator 14 is an intermediary system, which the operator has set to control the billing for the data communications services that it provides. It is set to limit the billing of the data communications connection between the first SIP client 11 and the second SIP client 12, in response to a predefined connection cut-off message with a specific connection identifier, received from the direction, such as the address, of the first 11 and/or the second SIP client 12.

The operator's traffic relaying system 15 is an IP-addressed system, set to be ready to provide a relay service subject to payment, to which is it advantageous to direct data communications, which have set or desired quality requirements. In addition to contacting terminal points, the operator's traffic relaying system 15 may also have the role of guaranteeing the quality of the data communications connection between them. Billing for this can be based on, for example, the network, time, event, and volume. The operator's traffic relaying system 15 includes a data-communications network set to be ready to relay, for a payment, IP-addressed data communications and possibly also related ancillary services. The firewall 16 is a traffic limiter, set to filter undesired traffic from outside the operator's traffic relaying system 15, and through which the operator's traffic relaying system 15 is set to open, or to keep open at least one data communications connection between a first SIP client 11 and a second SIP client 12. The SIP signalling takes place over a link that is separate from the data communications connection between the clients. When the SIP system 13 is used to analyse the state of this data communications connection, it is necessary to trust the messages sent by the clients.

In the known method for billing for the use of a data communications connection, the following stages are performed. Stages 101-104 are performed in order to set the operator's system to be ready to provide an IP call or a multimedia connection.

101) The means of the SIP system 13 for monitoring and billing for sessions are set for the mutual signalling link with the SIP client 11, outside of the SIP clients' mutual data communications connection.

102) The SIP client connections together with the signalling link are set to be genuinely packet switched, so that separate signalling links and circuit-switched subscriber networks that generally exploit data transmission capacity with a low loading, or other auxiliary networks, will no longer be needed.

103) At least one firewall 16 or other traffic limiter, based on the properties of the header fields of the packets being transmitted and possibly also on ports, is set for the mutual data communications connection of the SIP clients. The traffic limiter is a network element, which is set to exclude undesired data traffic over the packet network connection. The traffic limiter can also be set to limit the transmission speed of desired data traffic, in order to distribute limited data traffic resources in an appropriate manner.

104) A message connection is set for the SIP system 13 to the billing system, so that sessions can be monitored and billed for and so that the billing can be controlled and monitored. Stages 105-110 of the method are performed, in order to provide an IP call or multimedia connection and to bill for it.

105) A mutual data communications connection is set for at least two clients, through the operator's connection network.

106) At least one firewall 16 and/or other traffic limiter in the operator's traffic relaying system 15 is instructed to permit the passage of at least one session between the first 11 and the second SIP client 12.

107) Data on the state of a session between the first SIP client 11 and the second SIP client 12, such as a 'bye' message notifying of the termination of the session, is received over the SIP system 13 from the first 11 or the second SIP client 12.

108) In response to the received state data, the mediator 14 is instructed to limit the billing being monitored session-specifically.

109) At least one session is transmitted over the mutual data communications connection, and is then individuated, and 110) The billing to be charged for the data communications connection and being monitored session-specifically is controlled over the message connection, and/or the billing being monitored session-specifically is defined in the billing system. When defining the billing, the billing principles and/or the billing of the session can be set. When controlling the billing, a message or messages are sent to define the billing.

Figure 2:
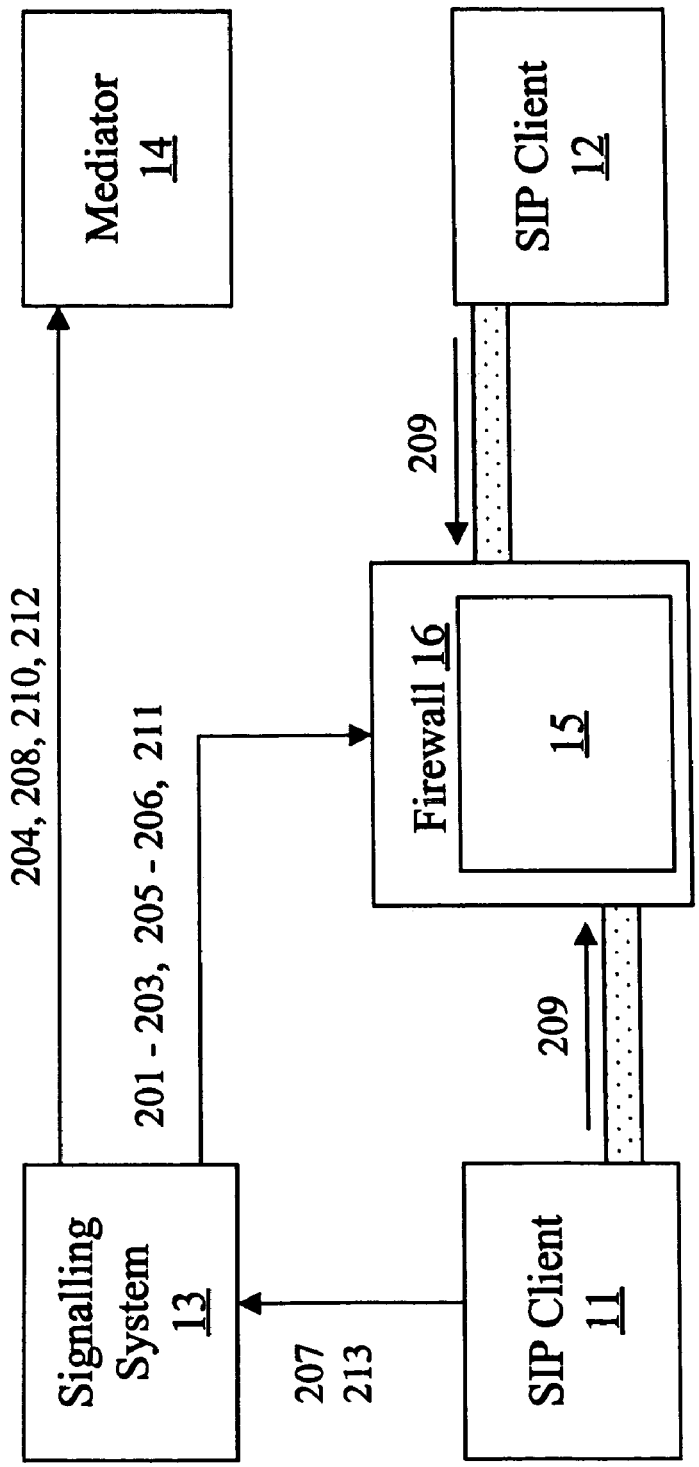
FIG. 2 shows one method according to the invention for limiting the use of a data communications connection on the basis of the method of FIG. 1.

It is preferable to use the method according to FIG. 2, if payment for the session is made afterwards (post-paid). In the method of FIG. 2, stages 201-206, which are the same as stages 101-106 of method 1, are performed. In the method according to the invention, stages 207-210, which correspond to stages 107-110, can also be performed. In the method, the following stages are also performed. Stages 211-216 are performed in order to prevent the fraudulent use of data communications resources without payment and to bill for the use of the data communications resources.

211) In response to a connection cut-off message received from the first 11 or the second SIP client 12, or to a message for interrupting or terminating the mutual data communications connection, the firewall 16 or other traffic limiter is instructed over the SIP system 13 to cut off, shut, interrupt, or prevent at least one session or data communications in its entirety between the first 11 and the second SIP client 12.

212) In response to a connection cut-off message or message for the interruption or termination of the mutual data communications connection, a message is directed over the SIP system 13 to the mediator 14, in order to monitor and/or to limit the billing.

In the method of FIG. 3 too, the elements of FIG. 1 are used to control the firewall. It is preferable to perform this method, if payment for the session is made beforehand (pre-paid). Stage 301 of the method of FIG. 3 is performed in order to monitor the existence of the payment required for the data communications connection between the first 11 and the second SIP client 12.

301) A state that will indicate an insufficient payment for the continuation of the session or data communications connection, and which can thus an initiator to the traffic-relaying system 15 to interrupt or terminate at least one mutual session or data communications connection between a first 11 and a second 12 SIP client, is set in the mediator 14 or the billing system controlled by it.

Stages 302-303 are performed in order to limit the fraudulent use without payment of data communications resources.

302) A reliable two-way signalling link is set between the connection-formation system and the billing system, through the mediator 14.

303) The mediator 14 is set to provide initiations for instructing the traffic-relaying system 15 to interrupt or terminate at least one mutual session between one first 11 and a second SIP client 12.

Stages 304-305 are performed on the basis of the billing system. If the prepaid payment allocated to the client or session has been used up and/or the credit limit, maximum charge and/or other monitoring criterion based on the quantity, quality, and/or value of the data communications, allocated to the session, is fulfilled, the relaying of data communications can be terminated in real time, or its properties can be limited. Connections can also be correspondingly opened in real time and flexibly.

304) A connection cut-off message and/or state data is received from the mediator 14 concerning an absence, in the billing system, or an insufficiency, in the billing system, of the payment required for providing a session relayed over a mutual data communications connection.

305) In response to the connection cut-off message received from the mediator 14 and/or to the state data, the firewall 16 is instructed by the SIP system 13 to close the data communications connection or session according to the connection cut-off message and/or the state data, between the first SIP customer 11 and the second SIP customer 12, or more generally in response to a connection cut-off message and/or state data received from the billing system, to use the means for monitoring and billing of the sessions to instruct at least one traffic limiter to cut off or interrupt the mutual data communications connection, or the session over the mutual data communications connection.

In stage 305, instead of or along with the SIP system, the mediator 14 can be set to directly control the firewall 16 or possibly the traffic-relaying system 15 controlling the firewall.

The method of FIG. 4 for increasing customer benefit can also be implemented using the elements disclosed in the previous figures. In the method, the stages of the method according to FIG. 2 are performed and/or the stages of the method according to FIG. 3. In addition to these, stages 401-404 of the method are performed.

Stages 401-402 of the method are performed in order to permit the use of and to bill for value-added services, such as multimedia services.

401) A tailored right to use the operator's traffic-relaying system 15 is set in the billing system, for the first SIP customer 11.

402) A value-added service initiation message concerning the first SIP customer 11 is received (402a) over the SIP system 13 and is forwarded (402b) to the mediator 14, or more generally a data-communications-based service initiation message is received over the connection-forming system, concerning at least one first client and one second client, and is forwarded to the billing system.

Stages 403-404 of the method are performed in order to set the operator's traffic-relaying system 15 dynamically to the state required for providing a value-added service.

403) A data-communications-based service use message is received while a message confirming the stimulus required for the use of the service is received from the mediator 14.

404) In response to the message, the operator's traffic-relaying system 15 is instructed to set the quality of the data communications connection between the first SIP customer 11 and the second SIP customer 12 to the level required by the value-added service according to the use message, or more generally, in response to the message confirming the initiation to instruct the operator's traffic-relaying system to control the formation of a mutual data communications connection between at least one first client and at least one second client, and/or to instruct the properties of the mutual data communications connection to be those required by a data-communications-based service, or to be advantageous in terms of a data-communications-based service.

The four methods disclosed above can be combined in full or in part, and thus new forms of method according to the invention for limiting the use of a data communications connection can be created. The precise embodiment to be employed is best selected on the basis of what is important in terms of the connection network, the billing system, and/or the clients.

Embodiments, differing from those disclosed above, can also be envisaged within the scope of the invention. The area of application of the invention is the provision of a data communications connection, subject to payment, targeted on IP addresses. The solution according to the invention is not tied to what is transported on top of this data communications connection. However, the invention is preferably applied to the transmission of IP voice and possibly related multimedia. Other types of traffic limiter can be used in place of the firewall 16. To control the transmission of IP voice or multimedia, other suitable protocols may be used for this purpose, either instead of SIP or in addition to it. The coverage of the firewall may be limited by its operator dependence. In order to achieve the desired prevention of traffic in the operator's traffic-relaying system 15, or to remove the desired prevention of traffic from the operator's traffic-relaying system 15, a series or a combination of firewalls and/or other traffic limiters may also be used. In such a case, it will of course be necessary, when opening connections, to take into account the fact that the entire chain must be opened. The SIP system 13 can include a PROXY server for use in making the necessary openings in the firewalls. It can be set to control the collection and transmission of billing data and the limitation and control of traffic, and/or the prevention of traffic. It is possible to use a session-specific identifier and set the traffic prevention on its basis. IP addresses, or other components of the header field of an IP packet, can be used as an additional basis for traffic limitation.

According to the SIP protocol, address modification can take place over the connection between the clients in the operator's traffic-relaying system 15, using a separate NAT server, and/or in connection with the SIP system 13. In the method according to the invention, the SIP clients can also be in multi-link connections, which when necessary are controlled, limited, and/or billed for. The quality of the data communications connection and/or session being provided can, if necessary, be improved or limited by activating and deactivating the service-quality field in the header fields of the IP packets. The SIP system 13 and the traffic limiters, such as the firewalls 16, can be set to communicate mutually, for example, by creating a protocol that takes into account the objectives set for data traffic between them. The protocol can be used to transmit the parameters of the connection, such as, for instance, the amount of data transmitted during the connection. It is possible to use, for example, the MIDCOM protocol to reliably open and close the necessary connections between the SIP customers 11 and 12.

The following abbreviations are used in this application

IP, Internet Protocol, NAT, Network Address Translation, NGN, Next Generation Networks, and SIP, Session Initiation Protocol.

When the invention is applied in practice, it is preferable to allow for the following factors:

The clients according to the embodiments are preferably unreliable clients, which communicate mutually and the communication between which, such as an image, sound, data, data stream, or some combination of these, travels over a route that is essentially different to that of the signalling between them. A data communications connection may have simultaneously more than two clients. The operator's traffic-relaying system 15 includes a data communications network, which has purely packet-switched customer interfaces with the clients according to the embodiments. The operator's traffic-relaying system 15 should have at least one port, through which the communication between the clients is arranged. The port must have a control system, such as the SIP system 13, which monitors, registers, and controls the traffic travelling through the port. The control system must be in signalling contact with at least one billing control unit, the mediator 14, which forms or collects at least one billing record, or edits at least one billing record for at least one client participating in the session.

The method can be applied in such a way that data traffic cannot pass the port of the traffic limiter, if the control system has not received a command to permit this. Thus, the control system is used to monitor the signalling channel, until the connection-formation command 'invite', or some other even in the signalling channel affirms that a connection should be formed between the clients. In response to the command given by the control system, a data communications connection is opened between the clients, through at least one port of the traffic limiter. Next, the control system is used to monitor the signalling channel, until the termination command 'bye', or some other event in the signalling channel affirms that the mutual communication of the clients of the session terminates, after which a command given by the control system is used to close the connections travelling through the port between the clients. Communication may also terminate without a separate signal. In any event, the port can be set to signal to the control system, if there is a break in the data communications connection arranged through the port, thus permitting the connection to be used as a basis for monitoring billing. This permits the formation of a billing record, according to the desired billing model, for the connection.

The monitoring to the connection-formation system can also be performed using the 'time-out' function of the SIP system 13. The operator can then set an interval at which the SIP system 13 checks whether the connection between the SIP clients 11 and 12 is in use. This gives the connection a rough termination time, which can be used as a basis for billing. The arrangement can be implemented, for example, with the aid of a proxy server.

The method can be further used to obtain additional benefit, using the fact that the billing model is connection-duration-based, otherwise time-based, volume-based, event-based, and/or customer-benefit-based. The control system can be set to record the approximate, estimated, or actual commencement and termination times of the data communications connection between the clients, for billing. The control system may be set to record the amount of data allowed through the port on the data communications connection being examined, for billing. The control system can be set to record the communication between the clients, on the basis of the commands they give and/or the billing tickets coming from the network, for billing.

Billing can be set to be collected either beforehand (pre-paid) or afterwards by invoice (post-paid). The billing unit and the control unit can be set to communicate in the manner required by the selected form of billing (pre-paid, post-paid). Both manners can also be applied in parallel.

It is preferable to set the communication between the clients to take place, for example, using the RTP or H.323 protocol. It is preferable to perform the monitoring and signalling, for example, using the MIDCOM, FCP (Firewall Control Proxy), or a similar protocol. The programs used by customers, such as Microsoft Messenger, support the TCP, UDP, and TLS protocols, among others.

The connection-formation system, such as the SIP system, can be set to open and/or close data communications connections and/or sessions between the clients 11 and 12, by means of operations according to the MIDCOM protocol.

It is preferable to use the SIP protocol on the signalling connections of the clients, while it is preferable for the clients to use a 'bye' message, according to the SIP, for forming, breaking, and interrupting the data communications connection. The packet-switched data communications connection is preferably an IP connection, more suitably a voice or multimedia connection. In the method, the source and target of the packets can be identified with the aid of the addresses, such as an IP address and port address, contained in their header fields. The identifier 'Call ID' of the session being examined can also be used for identification.

In place of, or in addition to the SIP system 13, it is possible to use other means over a signalling connection routed differently to the mutual data communications connection of the clients, for monitoring and billing for the sessions.

Reliable two-way intercommunication can be set between the SIP server 13 and the mediator 14, in which case data on the payment relating to the clients' mutual data communications connection will be obtained reliably from the mediator 14 and reliable data on the session will be obtained for the mediator 14, in order to monitor session billing session-specifically.

In the method according to the invention, signalling to and from the clients can be recorded. It is possible to break the data communications connection or limit the data communications connection on the basis of the recorded signalling. On this basis, it is also possible to close, interrupt, break, limit, and/or prevent individual sessions relayed over the data communications connection.

In this case, the term addressing refers to the destination's current IP address being tied to a natural-language identifier of the destination being sought, or to another more generally valid identifier of the IP address.

The breaking, interrupting, and/or closing of a session refers to all data transmission being terminated in the session, or the termination in the session of the transmission of data that is central or essential in terms of the operation of the session.

The invention can also be applied to combination pricing. This, for example, time and quantity-based pricing, in which the customer is charged, for example €0.50/minute for a maximum rate of a megabit per minute and, in addition to the megabit per minute rate, €0.03/kilobyte of data transmitted. In connection with this, the operator terminal of the signalling channel, such as the SIP system 13, forms a database, log, or ticket which preferably includes the session identifier, 'CallID'; the address or identifier of the first SIP client, the 'from' field; the address or identifier of the second SIP client 12, the 'to' field; the time of the start of the session, 'invite'; and the time of termination, 'bye'.

Alternatively, the database, log, or ticket can include the approximate or precise 'detected time-out' moment of the session and the IP address of the first SIP client 11.

The session identifier 'CallID' can be generated by the first SIP unreliable client 11, or the SIP system 13. If it is generated by the first SIP client 11, the system can then be set to monitor, for example with the aid of timestamps, whether the first SIP client 11 begins to generate several session identifiers CallIDs.

The invention claimed is:

1. A method for limiting and monitoring the use of a data communications connection subject to payment between at least two IP clients in a packet-switched connection network through which a mutual data communications connection is set between the at least two clients, the at least two clients including a client to be billed, the method comprising:

setting a signalling connection between a connection-formation system in the connection network and at least the client to be billed, the signalling connection being separate from the mutual data communications connection;

setting a traffic limiter in the connection network for the mutual data communications connection based on at least one header-field property of the packets being transmitted;

monitoring the data communications connection individually for an active session established over the mutual data communications connection between the at least two clients, the data communications connection being monitored for data communications services being provided to the client to be billed;

controlling the billing to be charged in a billing system session-specifically for the data communications connection based on the monitored data communications services;

receiving a message at the connection-formation system via the signalling connection concerning the interruption or termination of the session being transmitted over the mutual data communications connection;

in response to the message concerning the interruption or termination of the session, instructing the traffic limiter to break, interrupt, or close the session over the mutual data communications connection; and setting a two-way signalling link between the connection-formation system and the billing system through a mediator.

2. A method according to claim 1, wherein:

sessions are monitored and billed for using the connection-formation system by receiving a message from the client concerning the termination or interruption of a mutual session or other data communications connection, and in response to the message, the connection-formation system is used to:

direct a message to the billing system to limit the session-specific billing, and instruct the traffic limiter to close or interrupt the session or the mutual data communication connection through the connection network between the at least two clients.

3. A method according to claim 1, further comprising:

using the connection-formation system to receive an initiation message for a data-communications-based service involving at least one first client and at least one second client, and to forward the initial message to the billing system.

4. A method according to claim 1, wherein a message confirming the payment required for the use of a data-communications-based service is received from the direction of the billing system, and in response to the message confirming the payment, an operator's traffic-relaying system is instructed to perform at least one of:

cause the formation of a mutual data communications connection between the at least one first and one second client, and set properties of the mutual data communications connection to be those which are required by a data-communications-based service, or are advantageous in terms of the data-communications service.

5. A method according to claim 1, wherein the connection-formation system performs operations according to the MIDCOM protocol for at least one of:

opening or closing the data communications connection, and opening or closing the session between the at least two clients.

6. A method according to claim 1, wherein the connection-formation system includes an interface set for a SIP server in the direction of the traffic limiter.

7. A method according to claim 1, wherein the at least two clients includes a client, which is addressed to an address-search system being used.

8. A method according to claim 7, wherein a SIP system is used as the address-search system.

9. A method according to claim 7, wherein the connection-formation system is set to establish data communications connections between the at least two clients using the address-search system.

10. A method according to claim 1, wherein the billing system is set to initiate the provision of instructions to a traffic-relaying system of the connection network to interrupt or terminate a session between the at least two clients.

11. A system for limiting the use of a data communications connection subject to payment between IP clients in a packet-switched connection network, comprising:

a first device configured as a connection-formation system for setting a mutual data communications connection between at least two clients through the connection network, and for setting a mutual signalling connection separate from the mutual data communications connection;

a second device configured as a mediator for monitoring the data communications connection individually for an active session established over the data communications connection for data communications services provided to the clients, and controlling billing for the data communications connection to be charged session-specifically based on the monitored data communications services;

a third device configured as a traffic limiter based on properties of header fields of the packets being transmitted for the mutual data communications connection; and a traffic relaying system including a network for transmitting at least one session over the mutual data communications connection;

wherein the connection-formation system is configured to:
receive a message via the mutual signalling connection concerning the interruption or termination of the session being transmitted over the mutual data communications connection, instruct the traffic limiter to break or interrupt a session over the mutual data communications connection in response to the message concerning the interruption or termination of the session, and set a two-way signalling link between the connection-formation system and a billing system through the mediator.

12. A system according to claim 11, wherein the connection-formation system is configured to:
receive a message from a client terminating or interrupting a mutual session or other data communications connection, direct a message for limiting session-specific billing to the billing system in response to the received message, and instruct the at least one traffic limiter to close or interrupt the session or mutual data communications connection through the connection network between the at least two clients in response to the received message.

13. A system according to claim 11, wherein the connection-formation system is configured to receive an initiation message for a data-communications-based service concerning the at least two clients, and forward the initiation message to the billing system.

14. A system according to claim 11, wherein the connection-formation system is configured to:
receive from the billing system a message confirming the payment required for the use of the data-communications-based service, instruct the traffic-relaying system in response to the message confirming the payment, cause the formation of a mutual data communications connection between the at least two clients, and set properties of the mutual data communications connection to be those which are required by the data-communications-based service, or are advantageous in terms of the data-communications-based service.

15. A system according to claim 11, wherein the connection-formation system uses operations according to the MIDCOM protocol for at least one of:
opening or closing the data communications connection, and opening or closing the session between the at least tow clients.

16. A system according to claim 11, wherein the connection-formation system includes an interface set for a SIP server in the direction of the at least on traffic limiter.

17. A system according to claim 11, wherein the at least two clients includes a client addressed to an address-search system.

18. A system according to claim 17, wherein the address-search system is a SIP system.

19. A system according to claim 17, wherein the address-search system is used for setting the connection-formation system to establish data communications connections between the at least two clients.

20. A system according to claim 11, wherein the connection-formation system is configured to set the billing system to initiate the provision of instructions to the traffic-relaying system to interrupt or terminate the session between the at least two clients.

21. A method for limiting and monitoring the use of a data communications connection subject to payment between at least two IP clients in a packet-switched connection network through which a mutual data communications connection is set between the at least two clients, the method comprising:
setting a signalling connection between a connection formation system in the connection network and at least the client to be billed, the signalling connection being separate from the mutual data communications connection;

setting a traffic limiter in the connection network for the mutual data communications connection based on at least one header-field property of the packets being transmitted;

monitoring the data communications connection individually for an active session established over the mutual data communications connection between the at least two clients, the data communications connection being monitored for data communications services being provided to the client to be billed;

controlling the billing to be charged in a billing system session-specifically for the data communications connection based on the monitored data communications services;

receiving state data at the connection-formation system from the billing system over the message connection concerning an absence or a deficiency of a payment required in the billing system for providing the session being transmitted over the mutual data communications connection;

in response to the state data received from the billing system, instructing the traffic limiter to break, interrupt, or close the session over the mutual data communications connection; and setting a two-way signalling link between the connection-formation system and the billing system through the mediator.

22. A method according to claim 21 wherein a traffic-relaying system of the connection network is instructed to interrupt or terminate the session or data communications connection between the at least two clients in response to the state data indicating an insufficient payment in the billing system for continuing the session or data communications connection.

23. A method according to claim 21, wherein:
each session is monitored and billed for using the connection-formation system by responding to a message sent from the billing system concerning the lack or deficiency of a payment allocated to the session, in response to the message, the connection-formation system is used to:
- direct a message to the billing system to limit the session-specific billing, and
- instruct the traffic limiter to close or interrupt the session or the mutual data communication connection through the connection network between the at least two clients.

24. A system for limiting the use of a data communications connection subject to payment between IP clients in a packet-switched connection network, comprising:
- a first device configured as a connection-formation system for setting a mutual data communications connection between at least two clients through the connection network, and for setting a mutual signalling connection separate from the mutual data communications connection;
- a second device configured as a mediator for monitoring the data communications connection individually for an active session established over the data communications connection for data communications services provided to the clients, and controlling billing for the data communications connection to be charged session-specifically based on the monitored data communications services;
- a third device configured as a traffic limiter based on properties of header fields of the packets being transmitted for the mutual data communications connection; and
- a traffic relaying system including a network for transmitting at least one session over the mutual data communications connection, wherein the connection-formation system is configured to:
- receive state data from the billing system via a message connection concerning a lack or deficiency of payment required by the billing system for the provision of the session being transmitted over the mutual data communications connection,
- instruct the traffic limiter to break or interrupt a session over the mutual data communications connection in response to the state data received from the billing system, and
- set a two-way signalling link between the connection-formation system and a billing system through the mediator.

25. A system according to claim 24, wherein the connection-formation system is configured to instruct the traffic-relaying system to interrupt or terminate the session or data communication connection between the at least two clients in response to the state data indicating an insufficient payment in the billing system for continuing the session or data communications connection.

26. A system according to claim 24, wherein the connection-formation system is configured to:
- receive a message sent from the billing system in response to the insufficiency or smallness of a payment directed to the session,
- direct a message for limiting session-specific billing to the billing system in response to the received message, and
- instruct the traffic limiter to close or interrupt the session or mutual data communications connection through the connection network between the at least two clients in response to the received message.

27. A computer program stored on a computer-readable storage medium, the program comprising instructions to be executed by one or more computers to perform the combination of steps recited in claim 1 or 21.

* * * * *

UNITED STATES PATENT AND TRADEMARK OFFICE
CERTIFICATE OF CORRECTION

PATENT NO.      : 7,649,840 B2                                           Page 1 of 1
APPLICATION NO. : 10/516740
DATED           : January 19, 2010
INVENTOR(S)     : Kalland et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Twenty-eighth Day of December, 2010

David J. Kappos
*Director of the United States Patent and Trademark Office*